July 17, 1951 R. FERWERDA 2,560,562
CASTER
Filed June 5, 1948

INVENTOR
RAY FERWERDA
BY Hyde, Meyer, Baldwin & Doran
ATTORNEYS

Patented July 17, 1951

2,560,562

UNITED STATES PATENT OFFICE 2,560,562

CASTER

Ray Ferwerda, Lake Lucerne, Ohio

Application June 5, 1948, Serial No. 31,263

3 Claims. (Cl. 16—18)

This invention relates to caster wheels, and more particularly to such wheels when used for fairly heavy duty, such as for the wheels of automobile trailers or the like.

One object of the invention is to provide an improved caster wheel which not only freely swivels or turns about a vertical axis to present its plane of rotation in any direction, but which also has self accommodating tilting motion in any direction, enabling the wheel to adapt itself to any special or unusual conditions, such as travel through sand, soft dirt or the like.

Another object is to provide an improved caster wheel mounted on a universal joint and capable of swinging and turning in any direction around the joint center.

Another object is to provide such a freely swinging and turning caster with movable means extending above the center of swing for limiting and controlling the caster movement.

Still another object is to provide an improved caster wheel mounted to turn upon a universal joint and including a shank carried member traveling on a guiding and motion limiting raceway, thus to insure retention of the wheel in its correct position under all circumstances and conditions.

Further objects of the invention in part are obvious and in part will appear more in detail hereinafter.

Figure 1:
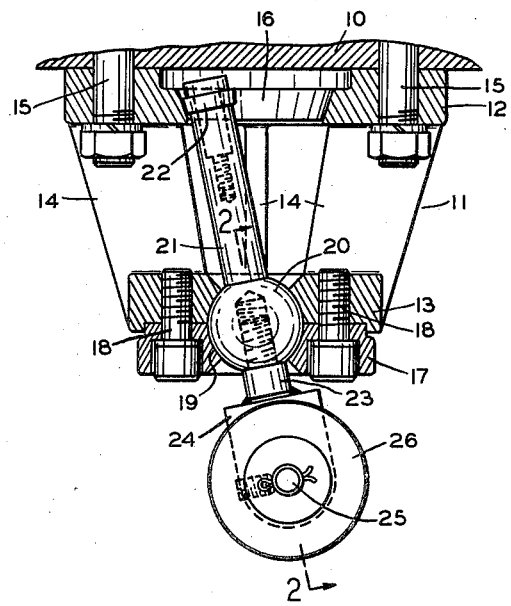
Fig. 1 represents a sectional view, partly in elevation, through one form of caster embodying the invention.
Figure 2:
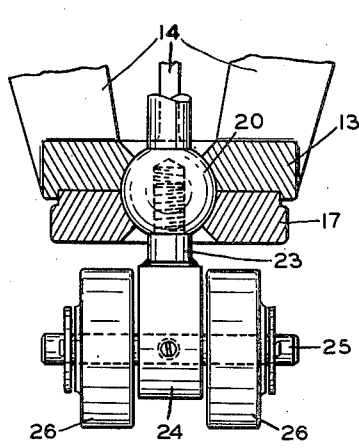
Fig. 2 is a similar view taken on the line 2—2, Fig. 1.

Referring to Figs. 1 and 2, 10 indicates a portion of the device to which the caster is to be secured, such for example as a suitable portion of the frame or chassis of an automobile trailer, although the caster may be used to support any load or device.

The caster itself consists of a suitable frame 11, shown as of generally open or cage form and including an upper ring 12 and a lower ring 13 connected by several legs or struts 14. Securement to member 10 is accomplished by bolts or screws 15. Ring 12 has a central opening surrounded by a tapered or conical track or raceway 16, the purpose of which will later appear.

Lower ring 13 is also provided with a central opening and cooperates with a holding ring 17 removably held to it by bolts 18.

The inner edges of the two rings 13, 17 are formed to provide a spherically formed seat surface 19 to receive a ball shaped member or portion 20 of a stem 21. This stem includes two arms, one extending upwardly into the cage where its upper end supports a small freely rotatable roller 22 which travels upon or along the raceway 16, the latter being conical, with its surface converging to the center of the universal ball point.

Below ring 17 the other arm of the stem 21 supports a rotatable floor or ground engaging unit or means, such as a caster wheel or wheels.

Figure 3:
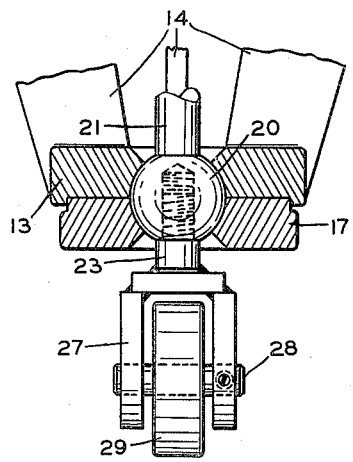
Fig. 3 is another similar view illustrating another form.

In Fig. 2, the ball has a threaded opening to receive the ground engaging unit, which here includes the threaded end of a bracket or stud 23 extending upwardly from a block 24 supporting a shaft 25 on which are journalled two like caster wheels 26, one on each side of the axis of stem 21. In Fig. 3, the unit includes stud 23 provided with a two armed yoke 27 supporting shaft 28 on which is journalled a single central caster wheel 29.

With either form the caster wheel (or wheels, if two are used) is supported upon a universal ball and socket joint and is capable of either or both of turning and tilting motions. Not only will it trail or lag behind, as any caster wheel should and does, but it is also self accommodating to lateral stresses, as when a trailer tends to slew around sideways in soft ground or sand. Whatever the position of the caster wheel the roller 22 hugs the raceway 16, which serves to guide the stem as the roller shifts around and to compel the caster wheel to trail or follow the appropriate course.

Other advantages of the invention will be apparent to those skilled in the art.

What I claim is:

1. A caster comprising a frame adapted for attachment to a support and provided with a spherical socket, a stem having a ball portion held in said socket and an arm extending outwardly from one side of the ball portion, the frame having a circular opening the edge portion of which provides an annular raceway along which the end of the stem travels, and a trailing unit mounted on the other side of the ball portion and provided with rotatable floor engaging means aligned with said arm on an axis which intersects the center of said socket, said raceway having a conical surface which converges toward the center of the socket.

2. A caster comprising a frame adapted for attachment to a support and provided with a spherical socket, a stem having a ball portion held in said socket and an arm extending outwardly from one side of the ball portion, the frame having a circular opening the edge portion of which provides an annular raceway along which the end of the stem travels, and a trailing unit mounted on the other side of the ball portion and provided with rotatable floor engaging means aligned with said arm on an axis which intersects the center of said socket, said raceway having a conical surface which converges toward the center of the socket, the stem arm being provided with a roller which travels along said conical surface.

3. A caster of the character described, comprising a frame including at one end a base plate provided with a central opening and adapted to be secured to a support and at the other end a body portion provided with a spherical socket having opposed openings aligned with the base plate opening along a central fixed axis, and a stem provided intermediate its ends with a ball portion held within said socket and having two opposed arms extending through the socket openings one toward and the other away from the base plate, the first arm entering the base plate opening and being freely movable to and fro therein to various positions around its periphery and the second arm carrying rolling floor engaging means which turns on an axis intersecting the stem axis, whereby said stem and the floor engaging means carried thereby automatically adjust themselves to various trailing caster positions on any side of said central axis and with the floor engaging means and first named arm always on opposite sides of the said fixed central axis.

RAY FERWERDA.

REFERENCES CITED

The following references are of record in the file of this patent:

UNITED STATES PATENTS

| Number | Name | Date |
|---|---|---|
| 1,770,756 | Markey | July 15, 1930 |

FOREIGN PATENTS

| Number | Country | Date |
|---|---|---|
| 4,078 | Great Britain | of 1889 |